United States Patent
Lautwein et al.

(10) Patent No.: US 10,023,442 B2
(45) Date of Patent: Jul. 17, 2018

(54) OVERLOAD PROTECTION DEVICE FOR CABLE STRANDS

(71) Applicant: M.A.T. Malmedie Antriebstechnik GmbH, Solingen (DE)

(72) Inventors: Christof Lautwein, Friesenhagen (DE); Christian Spura, Castrop-Rauxel (DE); Christoph Wagener, Geldern (DE)

(73) Assignee: M.A.T. Malmedie Antriebstechnik GmbH, Solingen (DE)

( * ) Notice: Subject to any disclaimer, the term of this patent is extended or adjusted under 35 U.S.C. 154(b) by 403 days.

(21) Appl. No.: 14/778,012

(22) PCT Filed: Feb. 4, 2014

(86) PCT No.: PCT/EP2014/052119
§ 371 (c)(1),
(2) Date: Sep. 17, 2015

(87) PCT Pub. No.: WO2014/146822
PCT Pub. Date: Sep. 25, 2014

(65) Prior Publication Data
US 2016/0280515 A1    Sep. 29, 2016

(30) Foreign Application Priority Data
Mar. 21, 2013   (DE) .................. 10 2013 205 000

(51) Int. Cl.
*F16B 21/16*    (2006.01)
*B66C 15/00*    (2006.01)
(Continued)

(52) U.S. Cl.
CPC ............... *B66C 15/00* (2013.01); *B66B 5/14* (2013.01); *B66C 15/06* (2013.01); *B66D 1/58* (2013.01);
(Continued)

(58) Field of Classification Search
CPC .. B66D 1/56; B66D 1/58; B66C 15/06; B66C 1/40; F16D 43/204; F16D 43/208;
(Continued)

(56) References Cited

U.S. PATENT DOCUMENTS 2,636,953 A * 4/1953 Hunt ................. G01G 19/14
                                                    200/85 R
3,095,979 A * 7/1963 Silberger ............ H01H 35/006
                                                    212/278
(Continued)

FOREIGN PATENT DOCUMENTS

CN    101402439 A    4/2009
CN    202625709 U   12/2012
(Continued)

OTHER PUBLICATIONS

International Search Report dated Apr. 3, 2014 in International Application No. PCT/EP2014/052119.
(Continued)

*Primary Examiner* — Josh Skroupa
*Assistant Examiner* — Matthew R McMahon
(74) *Attorney, Agent, or Firm* — Panitch Schwarze Belisario & Nadel LLP

(57) ABSTRACT

An overload protection device for cable lines, and in particular in cranes, is provided, having at least one electronic overload safety means. The overload protection device is provided to prevent any kind of damage which can be caused by an overload. That is achieved by providing a mechanical or magnetic overload protection device (1) in addition to the electronic overload safety means. The overload protection device (1) is integrated into the cable line or arranged at the cable fixing point and responds when a permissible cable tension force is exceeded and implements a cable extension.

4 Claims, 5 Drawing Sheets

(51) Int. Cl.
*F16D 7/06* (2006.01)
*B66C 15/06* (2006.01)
*B66D 1/58* (2006.01)
*B66B 5/14* (2006.01)

(52) U.S. Cl.
CPC .............. *F16B 21/165* (2013.01); *F16D 7/06* (2013.01); *Y10T 403/20* (2015.01); *Y10T 403/587* (2015.01)

(58) Field of Classification Search
CPC ... F16D 7/06; B66B 5/14; B66B 5/145; Y10T 403/20; Y10T 403/587; F16B 21/165
See application file for complete search history.

(56) References Cited

U.S. PATENT DOCUMENTS

| | | | | |
|---|---|---|---|---|
| 3,552,147 | A * | 1/1971 | Johansson et al. | B23B 31/38 192/56.1 |
| 3,683,355 | A * | 8/1972 | Collins | B66D 1/58 200/85 R |
| 3,723,017 | A * | 3/1973 | Bilz | B23B 31/1071 408/16 |
| 3,728,502 | A * | 4/1973 | Hawkins | H01H 35/006 200/85 R |
| 3,816,015 | A * | 6/1974 | Bilz | B23B 31/028 279/75 |
| 3,827,260 | A * | 8/1974 | Kato | F16D 7/10 464/35 |
| 3,918,301 | A | 11/1975 | Baer | |
| 3,936,622 | A * | 2/1976 | McElroy | B66B 5/145 200/85 R |
| 3,979,925 | A * | 9/1976 | Kato | F16D 7/10 464/35 |
| 4,041,729 | A * | 8/1977 | Bilz | B23B 31/38 192/56.5 |
| 4,090,802 | A * | 5/1978 | Bilz | B23B 49/001 408/11 |
| 4,122,928 | A * | 10/1978 | Smith | F16D 43/208 192/56.56 |
| 4,284,374 | A * | 8/1981 | Senzaki | B23B 31/1071 192/56.51 |
| 4,371,354 | A * | 2/1983 | McKean | F16D 7/08 464/36 |
| 4,432,246 | A * | 2/1984 | Granat | G01L 1/04 73/862.53 |
| 4,462,570 | A * | 7/1984 | Gagnet | B66D 1/58 254/268 |
| 4,599,019 | A * | 7/1986 | Ueberall | B23B 31/38 192/56.57 |
| 4,928,764 | A * | 5/1990 | Roessler | E21B 17/028 166/113 |
| 5,248,229 | A * | 9/1993 | Bilz | B23B 49/001 408/16 |
| 5,320,169 | A * | 6/1994 | Delatorre | E21B 17/07 166/113 |
| 5,616,080 | A * | 4/1997 | Miescher | F16D 43/208 192/56.1 |
| 8,393,569 | B2 * | 3/2013 | Gemmati | B64C 13/24 192/56.5 |

FOREIGN PATENT DOCUMENTS

| | | |
|---|---|---|
| DE | 1761772 U | 2/1958 |
| DE | 1573960 A1 | 11/1970 |
| DE | 151732 A1 | 11/1981 |
| DE | 102007062823 A1 | 8/2009 |
| FR | 1216411 A | 4/1960 |
| JP | S5164255 A | 6/1976 |
| JP | S5592695 U | 6/1980 |
| JP | S6443494 A | 2/1989 |
| JP | H05178582 A | 7/1993 |
| JP | 2000127540 A | 5/2000 |
| WO | 9215000 A1 | 9/1992 |
| WO | 2009079984 A1 | 7/2009 |

OTHER PUBLICATIONS

International Preliminary Report on Patentability dated Oct. 1, 2015 in International Application No. PCT/EP2014/052119.

* cited by examiner

OVERLOAD PROTECTION DEVICE FOR CABLE STRANDS

CROSS-REFERENCE TO RELATED APPLICATIONS

This application is a Section 371 of International Application No PCT/EP2014/052119, filed Feb. 4, 2014 which was published in the German language on Sep. 25, 2014 under International Publication No. WO 2014/146822 A1 and the disclosure of which is incorporated herein by reference.

BACKGROUND OF THE INVENTION

The invention concerns an overload protection device for cable lines, in particular in cranes, having at least one electronic overload safety means.

The European standards prescribe that overload safety means must be present on all power-operated lifting mechanisms. A crane construction is generally designed for a given permissible maximum overload. Exceeding that permissible maximum load can lead to considerable danger to the crane components (crane structure, cables, cable suspension systems and so forth) and cause permanent damage to the entire crane structure as well as consequential damage. Therefore cranes generally have at least one electronic overload safety means which switches off the crane operation when the permissible load is exceeded.

It will be noted that electronic overload safety means only take account of the load hanging from the crane. This means that, when the drive systems are shut down, under some circumstances an overload can hang from the respective crane so that damage to the crane by that overload cannot be excluded.

BRIEF SUMMARY OF THE INVENTION

Therefore the object of the invention is to provide an overload protection device which in relation to cranes avoids any kind of damage which can be caused by an overload.

According to the invention that object is attained in that in addition to the electronic overload safety means there is provided a mechanical overload protection device, that the overload protection device is integrated in the cable line or arranged at the cable fixing point and that the overload protection device responds when a permissible cable tension force is exceeded and implements a cable extension.

The basic concept of the invention provides that not only are the drives to be switched off when a predetermined permissible maximum load is exceeded, but in addition the cable line and thus the load cable are to be relieved of load when the permissible maximum load is exceeded and in addition the cable line is to be increased in length. If the suspended load exceeds the permissible maximum load then the overload protection is disengaged whereby the cable is increased in length by a defined amount. The result of this is that the overload does not have to be carried by the crane structure, thereby avoiding damage to the crane structure by overloading. Simultaneously with the disengagement of the overload protection device an electronic signal is produced, which causes the crane operation to be shut down.

The overload protection device can have a housing which is closed at one side and in which a load pin is longitudinally slidably guided. In normal operation, that is to say with a normal load, the load pin is fixed in the housing by means of a stroke force limiting device. At its end towards the closed side of the housing interior the load pin has a piston guided in the housing interior. In that arrangement the end of the shank, that is remote from the piston, is accessible from the exterior and can be connected to the cable line. When the permissible cable tensile force is exceeded the load pin can be released by the stroke force limiting device towards the open side of the housing.

The shank of the load pin is desirably guided longitudinally slidably by fitments arranged fixedly in the housing interior.

The fitments in the interior of the housing are preferably two mutually spaced nuts with a male thread, which are screwed into corresponding thread portions of the housing interior and bear in the axial direction against housing steps, the nuts having central bores for guiding the shank of the load pin.

Preferably a compression spring is arranged between the nut arranged closer to the closed side of the interior of the housing and the piston of the load pin. In the event of an overload occurring and with the triggering of the overload protection device, that is linked thereto, the cable load is carried by the spring when the load pin is released. The spring is compressed thereby, the intended increase in length of the cable occurs and the cable line is thereby relieved of load. The existing overload is compensated in that way. The spring travel which can be performed by the spring can be determined by a suitable construction for the spring and the spring constant thereof. Thus the spring determines the stroke speed as well as the stroke travel length.

The compression spring can be in the form of a coil spring.

Alternatively the compression spring can also be a plate spring pack which is to be designed in accordance with the predetermined conditions.

In accordance with a first embodiment the stroke force limiting device serving as the overload protection means has a mechanical structure. Triggering of overload protection can be effected by means of mechanical sliding surface disengagement elements, mechanical overload elements, mechanical safety elements or the like. Preferably the stroke force limiting device is in the form of spring-loaded balls or components provided with round ends, which engage into corresponding recesses in the shank of the load pin and fix it. Then, when a predetermined maximum permissible tensile force exerted on the load pin is exceeded, the balls or components can be displaced out of the recesses in the shank, whereby the load pin is released.

Alternatively, the stroke force limiting device can be a holding magnet in the form of a permanent magnet or electromagnet, at the closed end of the housing interior, the magnet acting on the magnetisable piston of the load pin and being fixedly connected to the housing, wherein the holding magnet releases the load pin when a predetermined tensile force exerted on the load pin is exceeded.

Further variants are possible as the stroke force limiting device. For example there can be provided two pressure rings of which at least one has a peripherally extending inclined surface, wherein the load pin is provided with a run-on inclined surface in the region of the pressure rings and provided between the inclined surface of the pressure rings and the run-on inclined surface of the load pin are balls arranged distributed around the periphery. When a load is exceeded the balls can be pressed outwardly by means of the run-on inclined surface of the load pin whereby at least one of the pressure rings is displaced against the force of a first compression spring in the longitudinal direction of the load pin. As a result the load pin is released and can move out of the housing against the force of a second compression spring.

In the middle region of the interior of the housing, preferably a nut provided with a male thread is screwed into a female thread provided in the housing interior and fixed in its position there. In that way the nut can act as a fixing point for the compression springs wherein the first compression spring is arranged between the nut and the upper pressure ring and the second compression spring is arranged between a piston provided near the closed end of the housing on the load pin and guided in the interior of the housing.

To be able to permit convenient assembly the housing can have a removable cover at its closed end. In addition the piston can be releasably fixed to the end of the load pin so that it is fixed to the load pin only after assembly of the other individual parts.

The electronic overload safety means can be disposed in the interior of the housing in the region of the piston of the load pin and can be triggered by a displacement of the piston in a direction towards the open end of the housing interior when the load pin is released by the response of the stroke force limiting device.

The electronic monitoring device can alternatively also be arranged in the interior of the housing in the region of the displaceable pressure ring, wherein triggering of the electronic monitoring device is effected by displacement of the pressure ring in a direction towards the closed end of the housing interior.

After the overload is removed the compression spring which acts on the piston provided on the load pin causes automatic resetting of the stroke force limiting device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
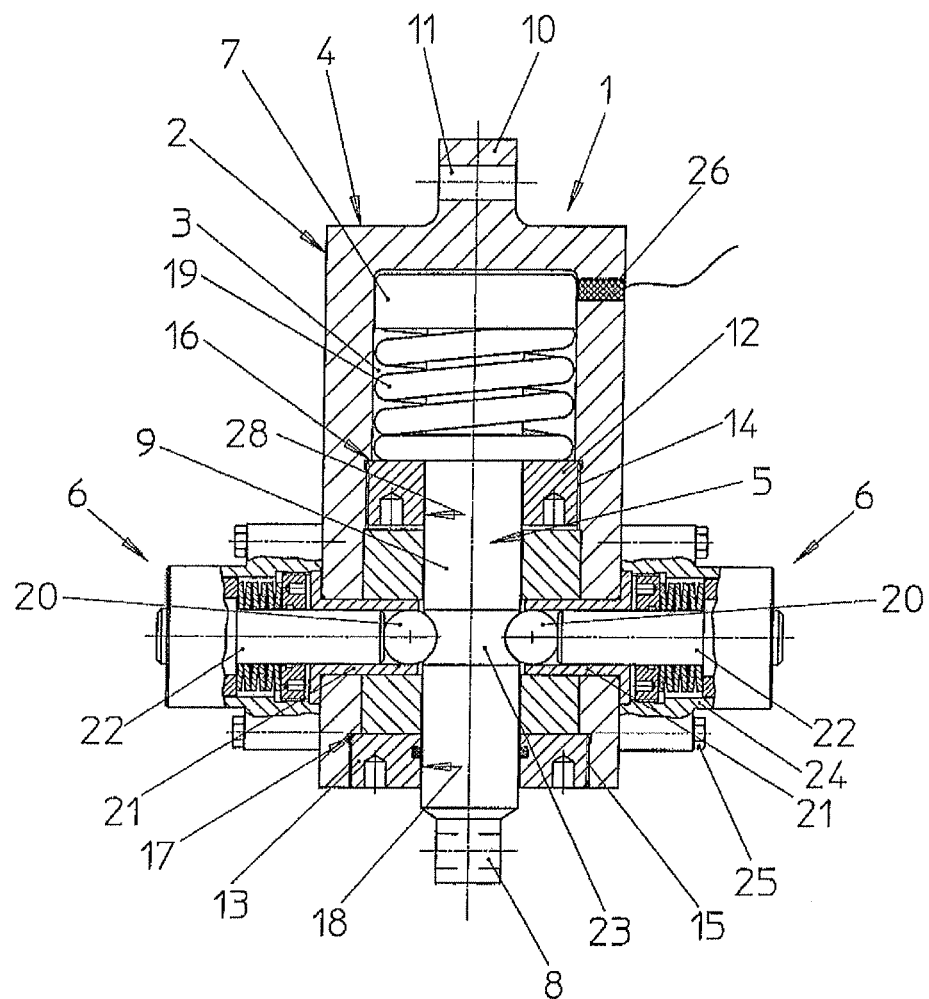
FIG. 1 shows a section through a first embodiment of an overload protection device in normal operation of a crane.
Figure 2:
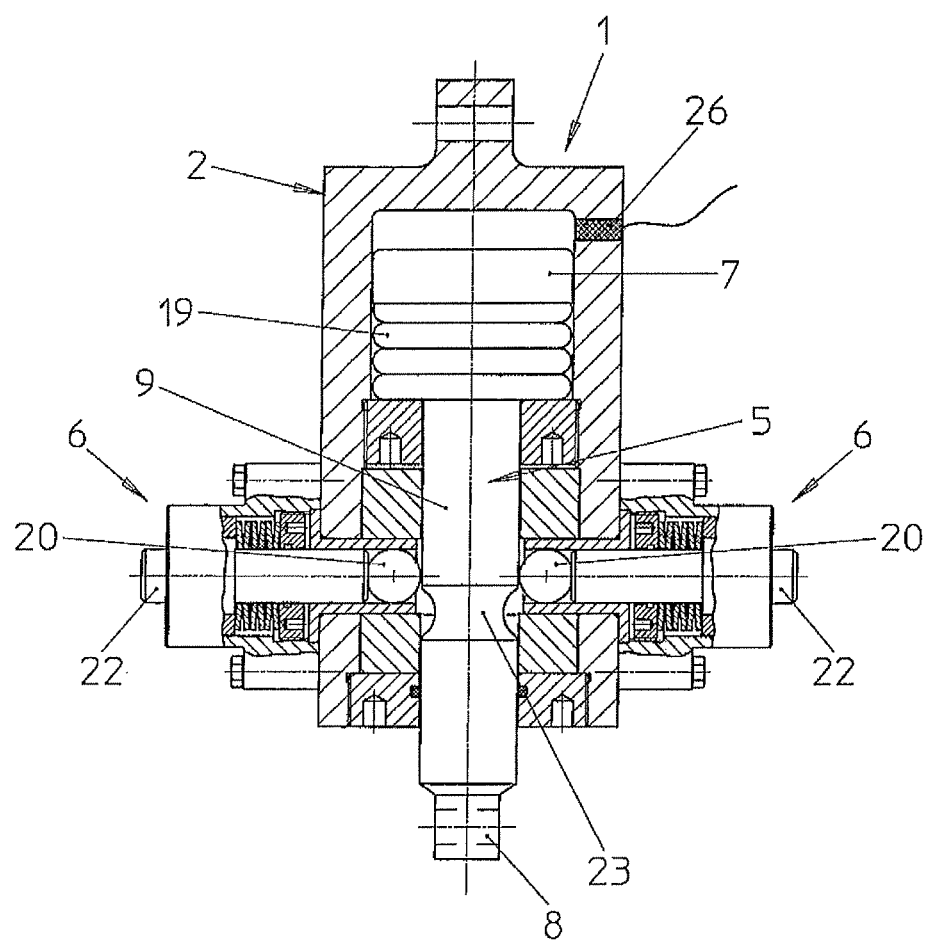
FIG. 2 shows the same section as FIG. 1 for the overload situation in which cable extension is caused.

As shown in FIGS. 1 and 2 of the drawing an overload protection device 1 substantially comprises a sturdy housing 2, preferably of steel, which has a central interior 3. The housing 2 is closed at its side 4 which is upward in the drawing and is open downwardly.

A load pin 5 is longitudinally slidably guided in the housing 2. In normal operation, when therefore the load hanging from the cable is in the permissible range, the load pin 5 is fixed preferably by means of two stroke force limiting devices 6 arranged on mutually opposite sides of the housing, that is to say the load pin 5 is fixed relative to the housing 2. Alternatively it is also possible to provide a plurality of stroke force limiting devices 6 arranged distributed around the periphery of the housing.

On its end towards the closed side 4 of the housing interior 3 the load pin 5 has a piston 7 which is guided against the walls of the interior 3 of the housing 2. In the present case the region, over which the piston 7 is slidable, is cylindrical.

The end 8, remote from the piston 7, of the shank 9 of the load pin 5 is accessible from the exterior and is connected to the cable line (not shown) of the respective crane.

The outer end 10 of the housing 2, that is shown upwards in the drawing, has a transverse bore 11 with which the housing 2 is mounted to the fixed mounting of the cable line.

When the maximum permissible cable tensile force is exceeded the load pin 5 is released by the stroke force limiting devices 6 and is displaced downwardly in the drawing towards the open end of the housing 2.

The shank 9 of the load pin 5 is longitudinally slidably guided in the housing interior 3 by fitments therein. In the embodiment shown in FIGS. 1 and 2 those fitments comprise two mutually spaced nuts 12 and 13 which are provided with a male thread and which are screwed into corresponding thread portions 14 and 15 of the interior 3. At their upper ends in the drawing the thread portions 14 and 15 have steps 16 and 17, against which the nuts 12 and 13 are screwed.

The nuts 12 and 13 have central bores 18 in which the shank 9 of the load pin 5 is guided.

A coil spring 19 is arranged between the upper nut 12 and the piston 7 of the load pin 5. When the stroke force limiting devices 6 release the load pin 5 when the permissible cable tensile force is exceeded and the load pin 5 moves a distance out of the housing 2 then the piston 7 of the load pin 5 compresses the spring 19.

The stroke force limiting devices 6 arranged on opposite sides of the housing 2 each comprise a ball 20 guided in a sleeve 21 extending to close to the shank 9 of the load pin 5. The balls 20 are urged in a direction towards the shank 9 of the load pin 5 by means of a respective spring-loaded pin 22. In that case the two balls 20 engage into an annular groove 23 in the shank 9, whereby the shank 9 is fixed in the axial direction. In that case the spring force acting on the balls 20 is so set that, when the maximum permissible tensile force acting on the cable line is reached, the load pin 5 displaces the balls 20 out of the groove 23 so that the lower end 8 of the load pin 6, that is connected to the cable line, can move out of the housing 2 and thereby increases the length of the cable.

The spring-loaded pins 22 of the stroke force limiting devices 6 are arranged transversely relative to the load pin 5 and are each mounted in a respective holder 24 fixed by means of screws 25 laterally to the housing 2 of the overload protection device 1.

In addition an electronic monitoring device 26 is arranged near the closed side 4 of the housing 2. When in the overload situation the piston 7 moves in the direction towards the open end of the housing 2 an interruption in operation of the crane is triggered by means of the electronic monitoring device 26. That additionally ensures that, when the stroke force limiting devices 6 respond, operation of the crane is shut down or only lowering of the load is still possible.

When the overload is let down and the cable line is relieved of load then the load pin 5 is urged back into its starting position shown in FIG. 1 by way of the coil spring 19 arranged in the housing 2. At the same time automatic resetting of the spring-loaded balls 20 of the stroke force limiting devices 6 takes place so that the overload protection device 1 is again fully operational and crane operation can be restored without any additional adjustments.

The overload protection device according to the invention can also be combined with an electronic overload safety device like for example a load measuring pin, that is provided on the crane or on the load pick-up means. The additional advantage achieved thereby is that two monitoring systems which operate independently of each other monitor the cable line and thus the crane construction.

Figure 3:
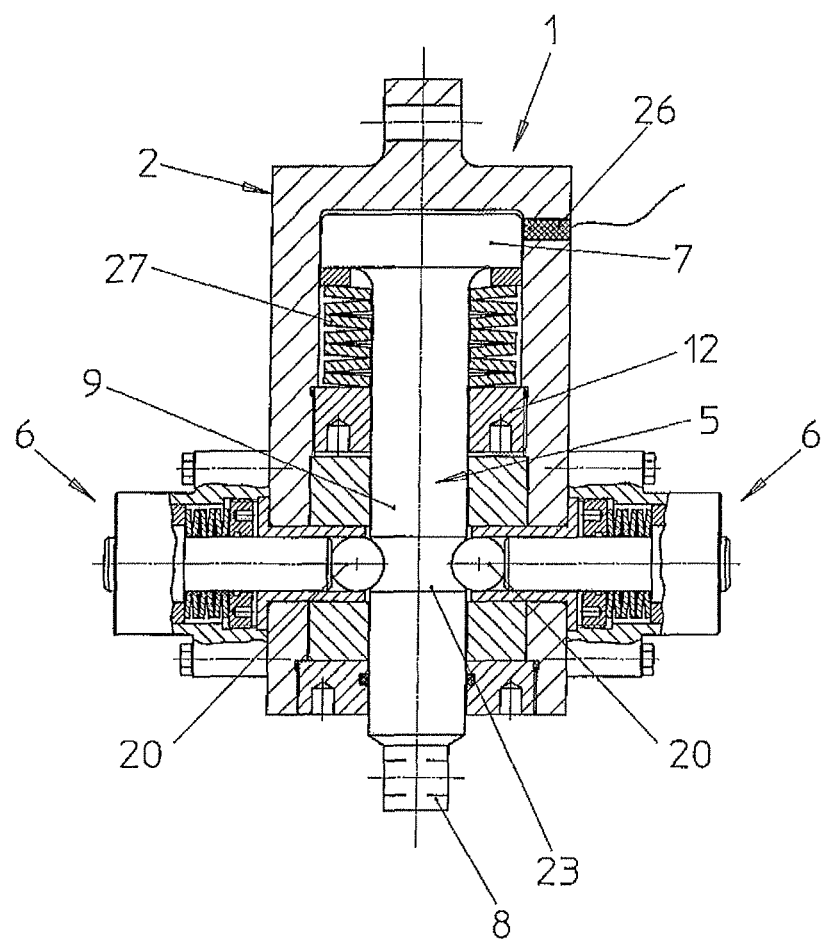
FIG. 3 shows a second embodiment of an overload protection device in normal operation of the crane.

In the embodiment shown in FIG. 3 the substantial components are identical to those of the embodiment of the overload protection device 1, as shown in FIGS. 1 and 2, the same references having been used for identical components.

The only difference in relation to the structure illustrated in FIGS. 1 and 2 is that, instead of the coil spring 19, arranged between the nut 12 and the piston 7 of the load pin 5 is a plate spring pack 27 which involves the same action and function as the coil spring 19.

Figure 4:
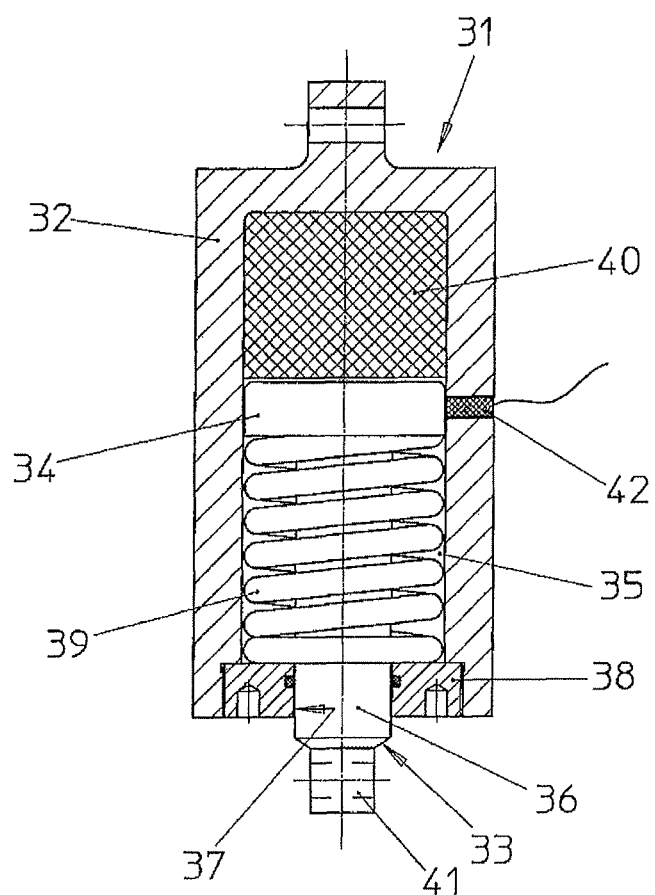
FIG. 4 shows a third embodiment of an overload protection device in normal operation of the crane.

In the embodiment shown in FIG. 4, instead of the mechanical stroke force limiting devices 6 illustrated in FIGS. 1 to 3, there is a magnetic overload protection device 31.

Just as in the embodiments shown in FIGS. 1 to 3 the overall arrangement of the overload protection device 31 comprises a housing 32 open at one end, and a load pin 33 axially slidably guided in the housing. The piston 34 of the load pin 33 is guided in the cylindrical interior 35 of the housing 32 while the shank 36 of the load pin 33 is slidably mounted in a bore 37 in a nut 38 screwed with a male thread into the open end of the housing 32.

Provided between the nut 38 and the piston 34 of the load pin 33 is a compression spring 39 which urges the piston 34 in a direction towards the closed end of the housing 32 against a magnet 40. The magnet 40 can be a permanent magnet or also an electromagnet.

In normal operation of the crane installation, when therefore the maximum permissible load is not reached, the piston 34 of the load pin 33 is held firmly against the magnet 40. It is only when the tensile force in the cable line exceeds the maximum permissible value and transmits the overload to the fixing end 41 of the load pin 33 that the piston 34 overcomes the attraction force of the magnet 40 and moves against the force of the compression spring 39 in a direction towards the open end of the housing 32, thereby causing an increase in the length of the cable.

Just as in the embodiments shown in FIGS. 1 to 3, the embodiment of FIG. 4 also has an electronic monitoring device 42 which is activated by the movement of the piston 34 in the direction towards the open end of the housing 32 and switches off the drive of the crane.

Figure 5:
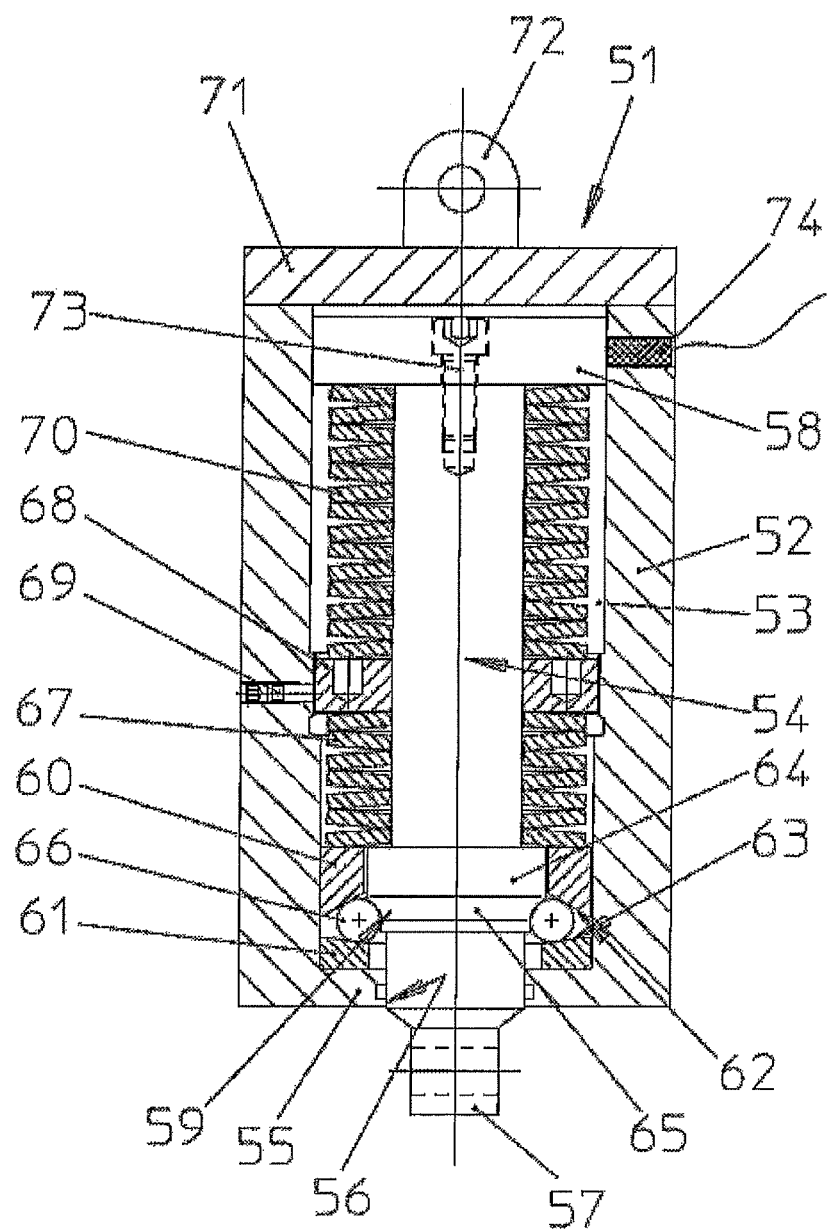
FIG. 5 shows a fourth embodiment of an overload protection device in normal operation of the crane.

In the embodiment shown in FIG. 5 the overload protection device, like the embodiments shown in FIGS. 1 to 4, comprises a downwardly open housing 52, in the interior 53 of which a load pin 54 is axially slidably guided. The end of the housing 52, which is shown downwardly in the Figure, has an inwardly directed flange 55 with a through opening 56 in which the lower end 57 of the load pin 54, that projects out of the housing 52, is guided. Just as in the first embodiments, disposed at the opposite end of the load pin 54 is a piston 58 guided in the housing interior 53.

The stroke force limiting device 59 is in the form of two pressure rings 60 and 61 each provided with a respective inclined surface 62 and 63, wherein the two inclined surfaces open in a wedge configuration in a direction towards the load pin 54.

In the region of the stroke force limiting device 59 the load pin 54 is provided with a peripherally extending thickened portion 64 which has a run-on inclined surface 65 at its side facing towards the through opening 56.

Balls 66 arranged distributed around the periphery are provided between the two inclined surfaces 62 and 63 of the pressure rings 60 and 61, and the run-on inclined surfaces 65.

The lower pressure, ring 61 in the drawing bears against the housing flange 55 while the upper pressure ring 60 is mounted axially slidably in the interior 53 of the housing 52 and is supported upwardly against a fixed mounting by way of a first compression spring 67. In the present case the fixed mounting comprises a nut 68 which is arranged in the housing interior 53 and which is provided with a male thread and which is screwed into a female thread provided in the housing interior 53 and is fixed in its position by means of a screw 69 which is screwed in radially from the exterior. In the embodiment illustrated in the drawing the compression spring 67 is in the form of a plate spring pack but it could also be replaced by a coil spring.

The piston 58 is supported against the nut 68 acting as the fixed mounting, by way of a second compression spring 70 which in the illustrated embodiment is in the form of a plate spring pack. Alternatively the second spring 70 could also be in the form of a coil spring.

In the event of the load being exceeded the balls 66 are urged outwardly against the pressure rings 60 and 61 by means of the run-on inclined surface 65 of the load pin, whereby the upper axially displaceable pressure ring 60 is displaced upwardly against the force of the first compression spring 67. When the balls 66 are displaced sufficiently far outwardly then the thickened portion 64 of the load pin 54 can slide past the balls 66 so that the load pin 54 is released. The load pin can then be displaced downwardly in the drawing against the force of the second compression spring 70.

In the present case assembly of the overload protection device 51 is effected from the closed side of the housing 52. For that purpose the housing 52 has a cover 71 fitted thereon, which can be fixed to the housing 52 by means of screws (not shown). At the same time the fixing device 72 for the overload protection device 51 is mounted to the cover 71.

To facilitate assembly the piston 58 can be releasably fixed to the upper end of the load pin 54 so that firstly the individual parts are assembled and then the piston 58 is fixed to the load pin 54 by means of a screw 73. To finish off the cover 71 is then screwed on to the housing 52.

Provided as the additional electronic monitoring device 74 is a sensor arranged in the housing interior at the height of the piston 58. When therefore the stroke force limiting device 59 responds and the piston 58 is displaced then crane operation is shut down by means of the electronic monitoring device 74. Alternatively the sensor could also be disposed at the height of the displaceable pressure ring 60.

After the overload is removed the pressure ring 60 together with the balls 66 is urged into its starting position shown in the drawing again by means of the compression spring 67 so that the stroke force limiting device 59 is immediately operational again and operation of the crane can be continued.

In the previously known constructions the problem occurred that, when the load to be picked up by the cable line was greater than the permissible overload, the cable line and therewith also the entire crane structure was loaded with the prevailing overload. The advantage of the structure according to the invention is now in particular that a relief of load on the crane structure is effected as a consequence of the extension of the load cable. If a load is lifted by means of the cable line and thus by the crane structure and if that load is greater than the permissible maximum load then the load cable is increased in length and the overload is not even transmitted to the crane structure at all.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An overload protection device for cable lines comprising:
 at least one electronic overload safety means,
 a mechanical or magnetic overload protection device (1; 31; 51) configured to be integrated into the cable line or arranged at a cable fixing point and configured to respond when a permissible cable tension force is exceeded and implements a cable extension,
 the mechanical or magnetic overload protection device (1; 31; 51) comprising:
  a housing (2; 32; 52) having an interior (3; 35; 53) and closed at one side,
  a longitudinally slidably guided load pin (5; 33; 54) in the housing (2; 32; 52), having a shank (9, 36) and a piston (7, 34, 58) at an end thereof toward the closed side of the housing interior (3; 35; 53) and guided in the housing interior (3; 35; 53), and
  a stroke force limiting device (6; 40; 59) fixing the load pin (5, 33, 54) in the housing (2; 32; 52) under normal operation,
 wherein the stroke force limiting device (59) comprises two pressure rings (60, 61), at least one of the pressure rings (60, 61) having a peripherally extending inclined surface (62, 63), and wherein the load pin (54) includes a run-on inclined surface (65) in the region of the pressure rings (60, 61), positioned proximate the inclined surface (62, 63) of at least one of the pressure rings (60, 61), the run-on inclined surface (65) of the load pin (54) interacting with balls which are arranged about a periphery of the run-on inclined surface (65), the balls (66) being urged outwardly when a permissible maximum load is exceeded by means of the run-on inclined surface (65) of the load pin (54) and at least one of the pressure rings (60) is displaced in the longitudinal direction of the load pin (54) against the force of a first compression spring (67), whereby the load pin (54) is released and can move out of the housing (52) against the force of a second compression spring (70),
 wherein an end of the shank (9; 36), remote from the piston (7; 34; 58), is accessible from an exterior of the device and connectable to the cable line, and the load pin (5; 33; 54) is released by the stroke force limiting device (6; 40; 59) toward an open side of the housing (2; 32; 52) when the permissible cable tensile force is exceeded, and
 wherein a nut (68) having a male thread is screwed into a fixed female thread located in the housing interior (53) in a central region thereof, the first compression spring (67) being arranged between the nut (68) and an upper pressure ring (60) of the pressure rings (60, 61) and the second compression spring (70) being arranged between the nut (68) and the piston (58) guided in the housing interior (53) near the closed side of the housing (52) on the load pin (54).

2. The overload protection device according to claim 1, wherein the shank (9; 36) of the load pin (5; 33; 54) is longitudinally slidably guided by fitments fixedly arranged in the housing interior (3; 35; 53).

3. The overload protection device according to claim 1, wherein the housing (52) includes a removable cover (71) at its closed side.

4. The overload protection device according to claim 1, wherein the piston (58) is releasably fixed to the end of the load pin (54).

* * * * *